United States Patent
Walton et al.

[11] Patent Number: 5,953,265
[45] Date of Patent: Sep. 14, 1999

[54] MEMORY HAVING ERROR DETECTION AND CORRECTION

[75] Inventors: John K. Walton, Mendon; Christopher S. Maclellan, Norwood, both of Mass.

[73] Assignee: EMC Corporation, Hopkinton, Mass.

[21] Appl. No.: 08/941,509

[22] Filed: Sep. 29, 1997

[51] Int. Cl.$^6$ ..................................................... G11C 7/00
[52] U.S. Cl. .......................... 365/200; 371/30; 371/40.11; 371/40.2
[58] Field of Search ............................... 365/200; 371/10, 371/51.1, 30, 40.1, 40.2, 40.4

[56] References Cited

U.S. PATENT DOCUMENTS

| | | | |
|---|---|---|---|
| 4,768,193 | 8/1988 | Takemae | 371/10 |
| 5,179,536 | 1/1993 | Kasa et al. | 365/200 |
| 5,577,004 | 11/1996 | Leshem | 365/230.03 |
| 5,671,239 | 9/1997 | Higashitani et al. | 371/51.1 |

*Primary Examiner*—David Nelms
*Assistant Examiner*—David Lam
*Attorney, Agent, or Firm*—Fish & Richardson P.C.

[57] ABSTRACT

A memory system having: a plurality of memory packages for storing words, each one of the packages being adapted to store a plurality of different bits of the word; and an error detection and correction system adapted to detect an error produced in any one of the packages in storing the digital word. With such an arrangement, an error produced by a defect in one of plurality of memory packages, each adapted to store more than one bit of a digital word, may be corrected without requiring changes to other EDACs used in a system employing such memory system. The memory system has a buffer for storing a digital word having N bits of data and M redundant bits for error detection and correction. An error correction code generator is provided for converting the digital word into a second digital word having N bits of data and P redundant bits for error detection and correction. A memory is used for storing the N+P digital word. A error correction code detector corrects an error the data read from the memory.

13 Claims, 7 Drawing Sheets

MEMORY HAVING ERROR DETECTION AND CORRECTION

BACKGROUND OF THE INVENTION

This invention relates generally to memories and more particularly to memories having error detection and correction.

As is known in the art, error correction and detection codes are used with data to correct errors which may occur in propagation of the data, or to at least detect the presence of an error in the propagated data. For example, a Reed-Solomon or Hamming code may be used to provide redundant bits to data. The data, with the redundant code, is fed through a portion of a system. When outputted from the system, the redundant code together with the data enables an error correction and detection (EDAC) process to reconstruct the data if one bit has been corrupted and to detect an error in the data if two bits have been corrupted. Such is sometimes known as SECDED, i.e., Single Error Correction/Double Error Detection.

In many data processing systems, random access memories (RAMs), such as dynamic RAMs (i.e., DRAMs) are used and the data with associated redundant bits is stored as a word in the DRAM. After the word is read from the DRAM it passes through an EDAC to correct or detect errors which may have occurred in the DRAM. In the past, these DRAMs were arranged in an N×1 bit arrangement, where N may is the number of bits in the word. One application for these DRAMS is as cache memories where data is passed from a disk drive to a computer through an interface having controllers. For example, one system includes a large mainframe computer which requires large capacity data storage. These large main frame computer systems generally includes data processors which perform many operations on data introduced to the computer system through peripherals including the data storage system. The results of these operations are output to peripherals, including the storage system. One type of data storage system is a magnetic disk storage system. Here a bank of disk drives and the main frame computer system are coupled together through an interface. The interface includes CPU, or "front end", controllers and "back end" disk controllers. The interface operates the controllers in such a way that they are transparent to the computer. That is, data is stored in, and retrieved from, the bank of disk drives in such a way that the mainframe computer system merely thinks it is operating with one mainframe memory. One such system is described in U.S. Pat. No. 5,206,939, entitled "System and Method for Disk Mapping and Data Retrieval", inventors Moshe Yansi, Natan Vishlitzky, Bruno Altersu and Daniel Castel, issued Apr. 27, 1993, and assigned to the same assignee as the present invention.

As described in such U.S. patent, the interface may also include, in addition to the CPU controllers and disk controllers, addressable cache memories. The cache memory is a semiconductor memory and is provided to rapidly store data from the main frame computer system before storage in the disk drives, and, on the other hand, store data from the disk drives prior to being sent to the main frame computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk controllers are mounted on disk controller printed circuit boards. CPU controllers are mounted on CPU controller printed circuit boards. And, cache memories are mounted on cache memory printed circuit boards. The disk controller, CPU controller and cache memory printed circuit boards plug into the backplane printed circuit board. In order to provide data integrity in case of a failure in a controller, the backplane printed circuit board has a pair of buses. One set the disk controllers is connected to one bus and another set of the disk controllers is connected to the other bus. Likewise, one set the CPU controllers is connected to one bus and another set of the CPU controllers is connected to the other bus. The cache memories are connected to both buses. Thus, the use of two buses provides a degree of redundancy to protect against a total system failure in the event that the controllers, or disk drives connected to one bus fail.

In such system, the SECDED is provided on the controllers to encode data being sent to the cache memory and to check the integrity of data retrieved from the cache. Thus, as noted above, in the past, theses DRAMs were arranged in an N×1 bit arrangement, where N is the number of bits in the word stored in the DRAM, for example, N may be 72. More particularly, each data is, in this example, 64 bits and has associated with it 8 redundant bits to thereby constitute a word having 72 bits. Thus, the DRAM is made up of 72 DRAM packages, $P_1$–$P_{72}$, each package having one bit word length and adapted to store k, one bit words, $W_0$–$W_x$, where k may be 16 megabits, for example, as shown in FIG. 1A. Thus, packages $P_1$–$P_{64}$ store each store a corresponding one of the 64 data bits and each one of the packages $P_{65}$–$P_{72}$ store a corresponding one of the redundant bits for the EDAC. Today, however, the use of M×4 bit arrangements are being used for the DRAMs. Thus, each DRAM package is adapted to store, four bit words, $W_0$–$W_x$, as shown in FIG. 1B. That is, each one of the packages $P'_1$–$P'_{16}$ stores a correspond set of four bits (i.e., a nibble) of the 64 data bits, and packages $P'_{17}$ and $P'_{18}$ each store a set of four bits of the 8 redundant bits for EDAC. As noted in the system above, the EDAC is performed on the controllers. However, the EDAC used in the controllers is a SECDED EDAC and are not adapted to detect a failed M×4 type DRAM package. One technique suggested is to change the EDAC on the controllers so that they will be able to correct for nibble errors; however, such is relatively expensive, particularly if retro-fitting, or up-dating of existing equipment is not desired.

SUMMARY OF THE INVENTION

In accordance with the invention, a memory system is provided having: a plurality of memory packages for storing words, each one of the packages being adapted to store a plurality of different bits of the word; and an error detection and correction system adapted to detect an error produced in any one of the packages in storing the digital word.

With such an arrangement, an error produced by a defect in one of plurality of memory packages, each adapted to store more than one bit of a digital word, may be corrected without requiring changes to other EDACs used in a system employing such memory system.

In accordance with another feature of the invention, a memory system is provided having a buffer for storing a digital word having N bits of data and M redundant bits for error detection and correction. An error correction code generator is provided for converting the digital word into a second digital word having N bits of data and P redundant bits for error detection and correction. A memory is used for storing the N+P digital word. An error correction code detector corrects an error in the data read from the memory.

In accordance with still another feature of the invention, a memory system is provided having a plurality of memory packages for storing words. Each one of the packages is adapted to store a plurality of different bits of the word. An error detection and correction system is adapted to detect an error produced in any one of the packages in storing the digital word. The error detection and correction system includes a buffer for storing the word. The word has N bits of data and P redundant bits for error detection and correction. An error correction code generator converts the word into a second word having N bits of data and P redundant bits for error detection and correction. A memory stores the N+P word. An error correction code detector corrects an error in the data read from the memory.

BRIEF DESCRIPTION OF THE DRAWING

Referring now to the accompanying drawings.

DESCRIPTION OF THE PREFERRED EMBODIMENTS

Figure 2:
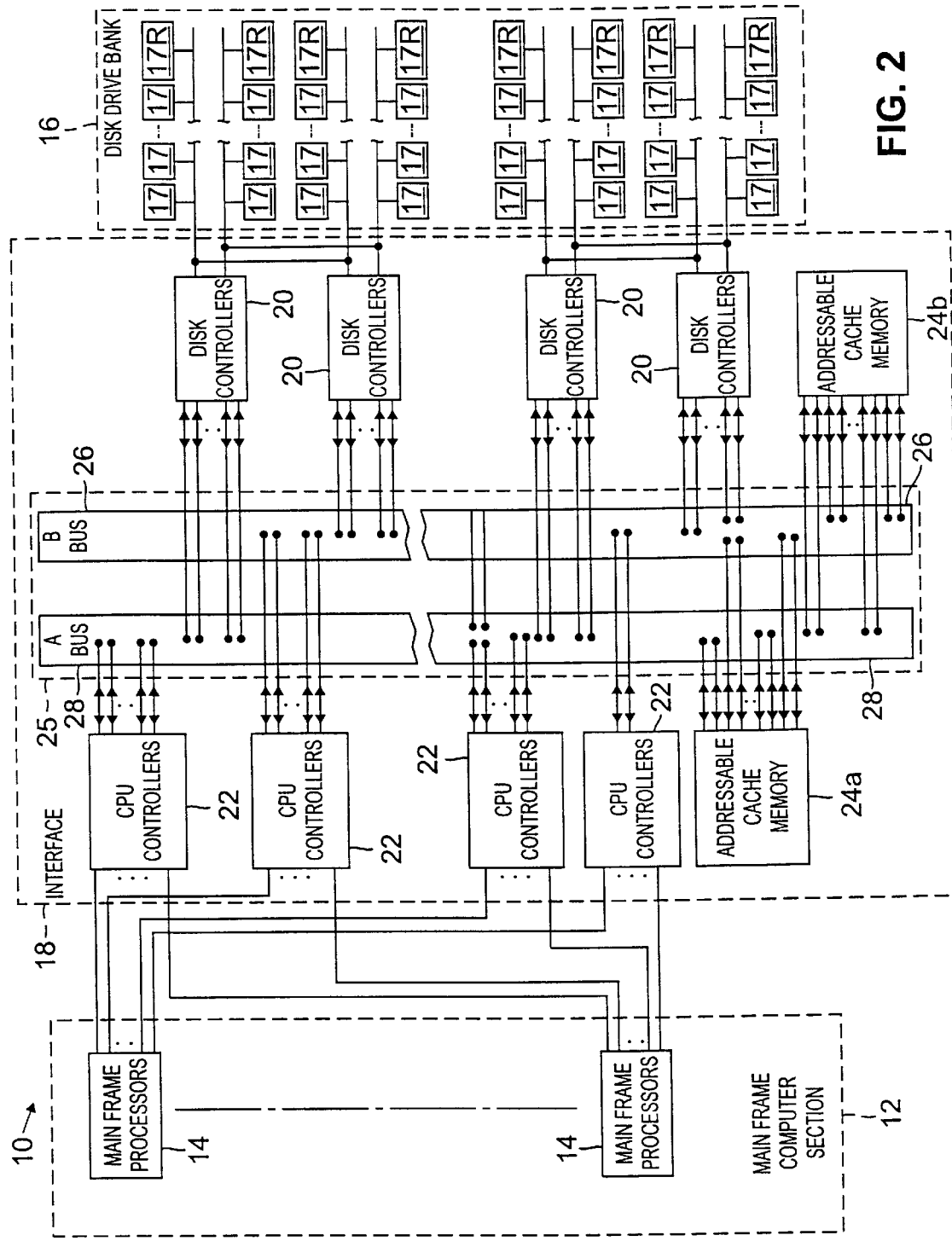
FIG. 2 is a block diagram of a computer system using a data storage system in accordance with the invention.

Referring now to FIG. 2, a computer system 10 is shown. The computer system 10 includes a main frame computer section 12 having main frame processors 14 for processing data. Portions of the processed data are stored in, and retrieved data from, a bank 16 of disk drives 17 through an interface 18. It is noted that for each of a set of disk drives 17 there is associated with such set a redundant disk drive 17R. Thus, the redundant disk drive 17R is provided for each of a set of disk drives 17. This redundant disk drive 17R stores data, i.e., a parity bit, which is generated in a manner to be described in detail in connection with FIG. 6 as a result of providing an exclusive OR function on the data in each of the other disk drives 17 in the set. If one of the disk drives 17 in the set fails, the failed disk drive is replaced and the data in the failed disk drive is reconstructed by providing an exclusive OR function on the data in the redundant disk drive 17R and in the non-failed ones of the set of disk drives 17.

The interface 18 includes disk controllers 20, central processor unit (CPU) controllers 22 and addressable cache memories 24a, 24b electrically interconnected through a bus 25, here a pair buses; i.e., an A bus 28 and a B bus 26. The cache memories 24a, 24b are hereinafter sometimes referred to only as addressable memories.

More particularly, in order to provide data integrity in case of a failure in a disk controller 20 or CPU controller 22, the pair of buses 26, 28 is provided. One portion of the disk controllers 20 is connected to one of the buses 26, 28 and the other portion of the disk controllers 20 is connected to the other one of the buses 26, 28. Likewise, one portion of the CPU controllers 22 is connected to one of the buses 26, 28 and the other portion of the CPU controllers 22 is connected to the other one of the buses 26, 28. The cache memories 24a, 24b are connected to both buses 26, 28, as shown.

Figure 3:
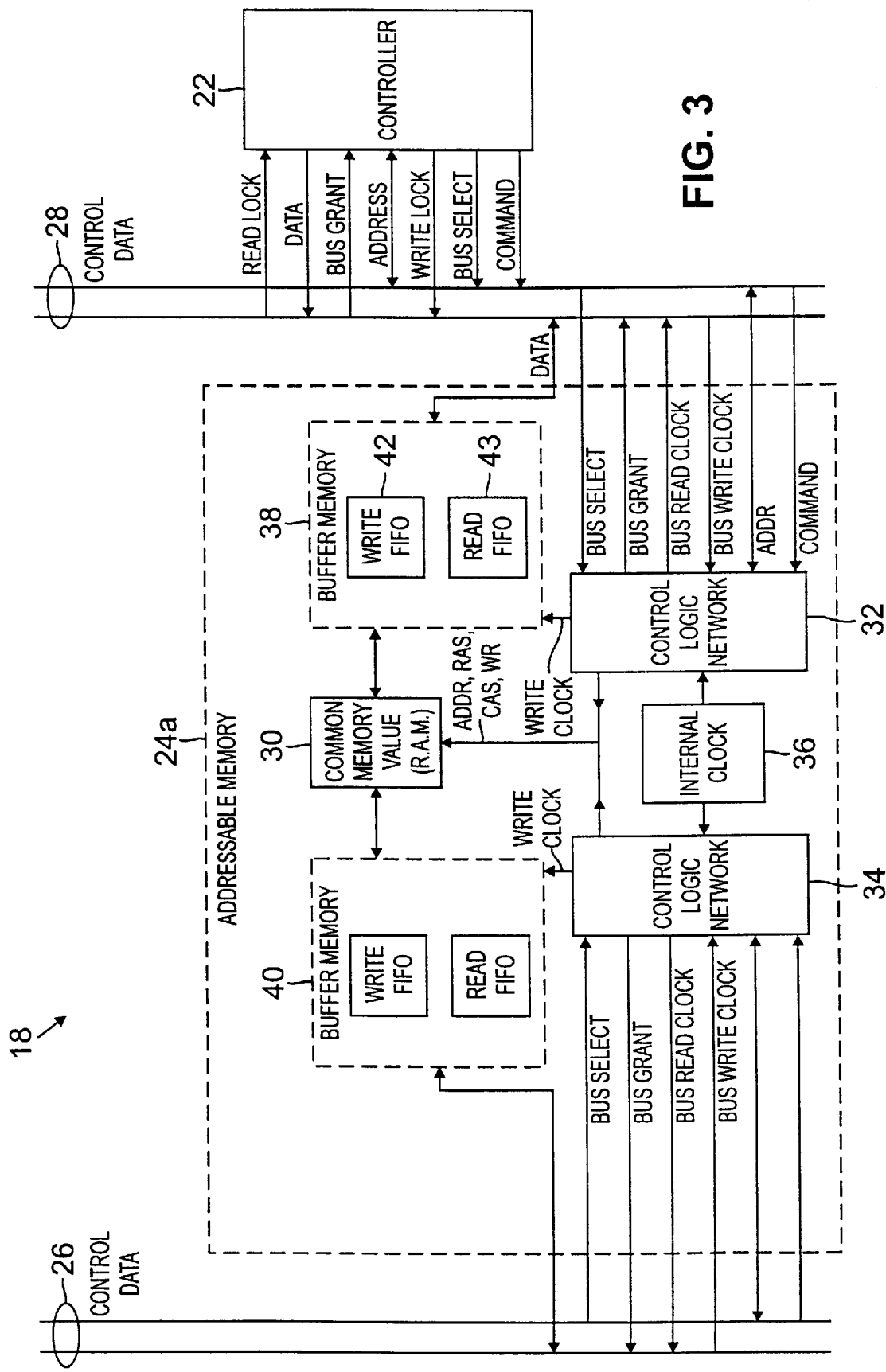
FIG. 3 is a block diagram of an interface used in the data storage system of FIG. 2, such interface providing coupling between main frame computer processors and a bank of disk storage devices according to the invention.

Referring now to FIG. 3, the interface 18, and more particularly, one of the addressable cache memories 24a, 24b, here memory 24a, is shown in detail. The addressable memory 24a includes: a random access memory (RAM) 30, here a dynamic random access memory (DRAM) adapted for coupling to bus 26 or bus 28 in response to row address select (RAS), column address select (CAS) write enable (W) and read enable (R) signals fed thereto; a pair of control logic networks 32, 34; internal clock 36; and a pair of buffer memories 38, 40, all arranged as shown. It is first noted that while the DRAM 30 is common to both buses 26, 28, control logic network 32 and buffer memory 38 are associated with bus 28 and control logic network 34 and buffer memory 40 are associated with bus 26. A token arbitration system, not shown, is provided for controlling sharing of the pair of buses 26, 28 by the common DRAM 30. One such bus arbitration system is described in co-pending patent application Ser. No. 08/534,376, "Bus Arbitration System, inventor Eli Leshem, filed Sep. 28, 1995, assigned to the same assignee as the present invention, the contents thereof being incorporated herein by reference.

Each one of the buffer memories 38, 40 includes a write first-in/first-out memory (FIFO) 42 and a read FIFO 43. Use of FIFOs in a system is described in co-pending patent application Ser. No. 08/701,917, filed Aug. 23, 1996, entitled "Data Storage System Having Master/Slave Addressable Memories", assigned to the same assignee as the present invention, the entire subject matter thereof being incorporated herein by reference.

Figure 1A:
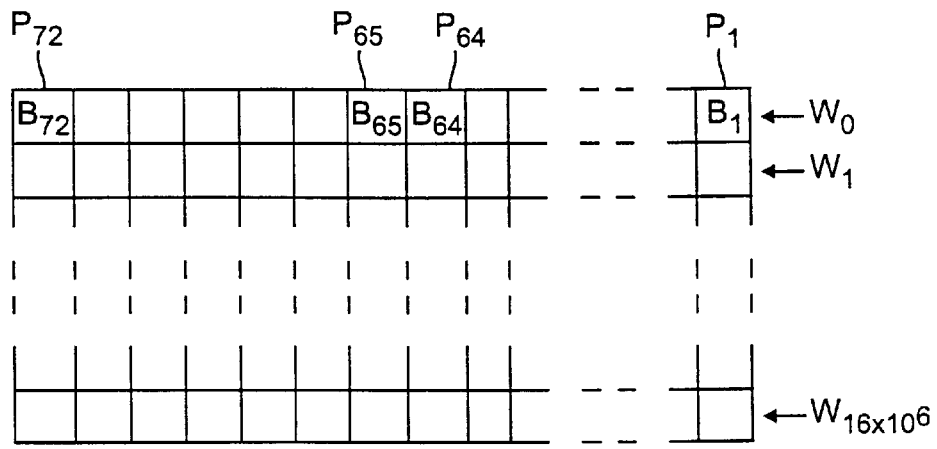
FIGS. 1A and 1B are diagrams of N×1 and M×4 DRAM packages, respectively, according to the PRIOR ART.
Figure 1B:
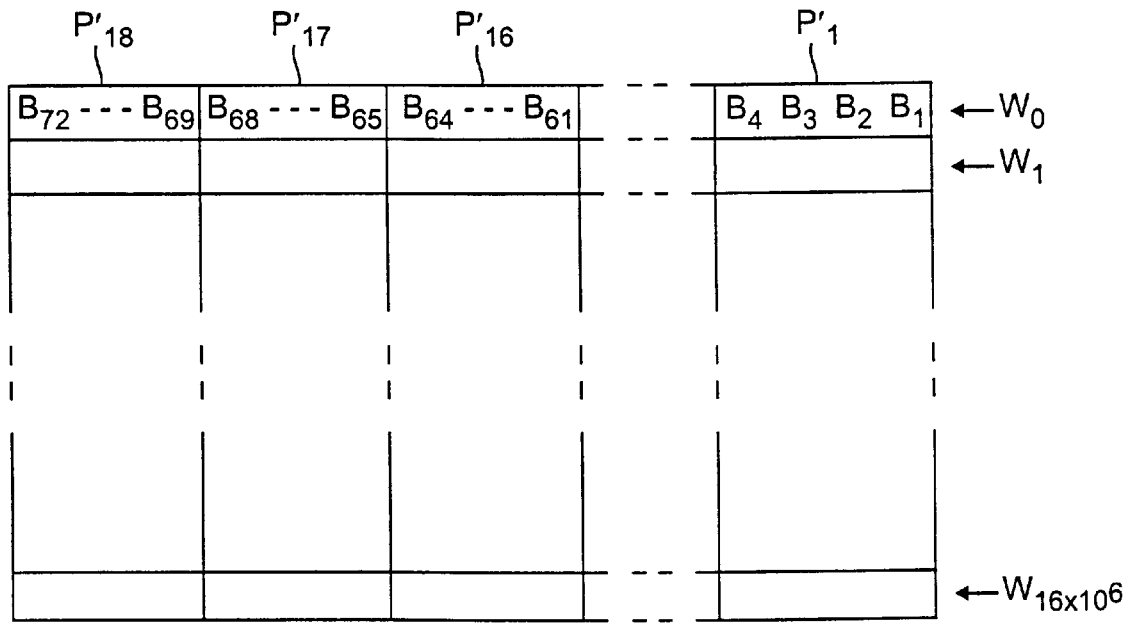
Figure 2A:
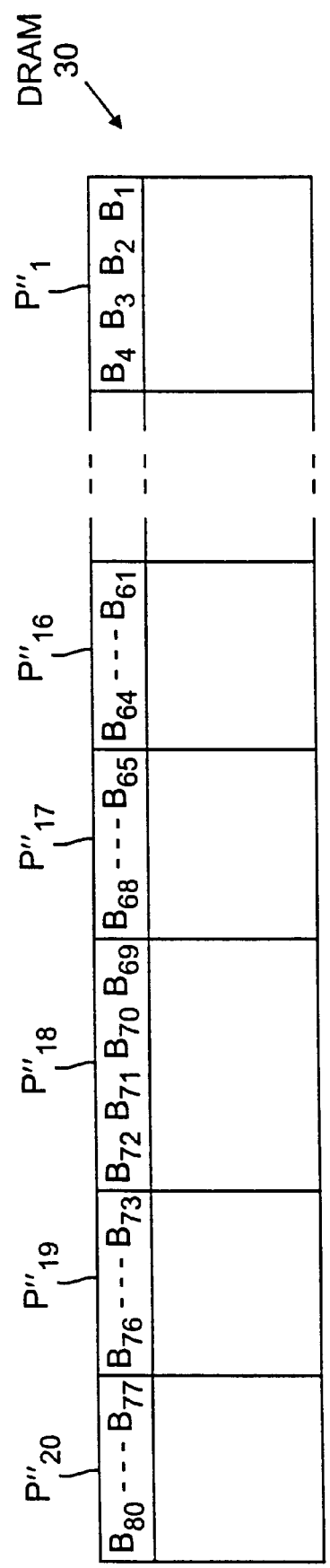
FIG. 2A is a diagram of DRAM package according to the invention.

It is first noted that each one of the controllers 22 includes a SECDED EDAC to check for the integrity passing between such one of such controllers, through the memory 22a, 22b and to another one of the controllers 22. Here, such SECDED EDAC is a conventional double-bit Hamming code. It is next noted that here the control memory DRAM 30 (FIG. 2) is a 4×L type described in connection with FIG. 1A, where here L is 80. Thus, the DRAM 30 includes, in this example, 20 packages $P''_1$–$P''_{20}$, as shown in FIG. 2A.

Figure 4:
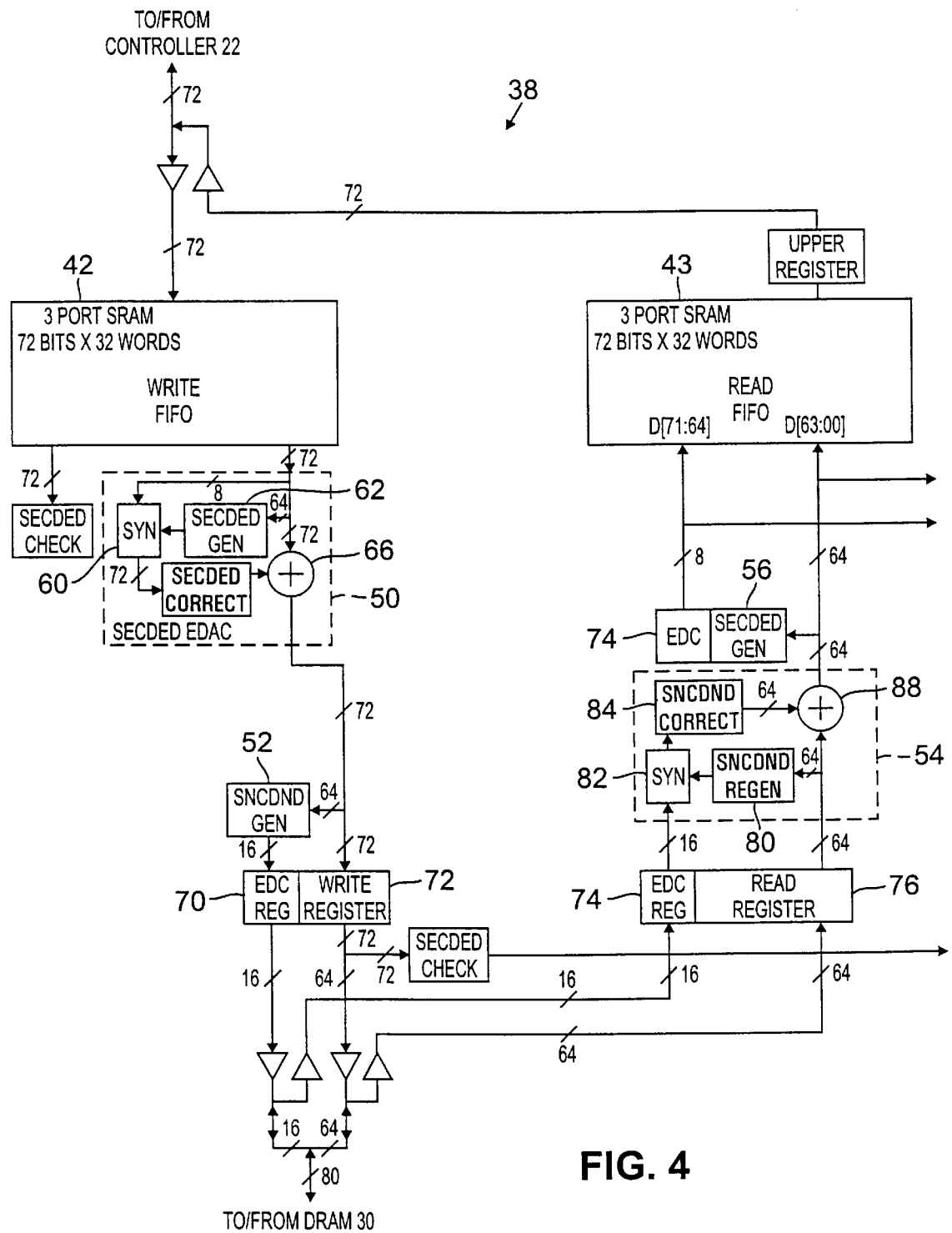
FIG. 4 is a block diagram of an exemplary one of a pair of buffer memories used in the interface of FIG. 3 according to the invention.

Referring to FIG. 4, an exemplary one of the buffer memories 38, 40, here buffer memory 38 is shown in detail to include: the pair of FIFOs 42, 43; a two-bit Hamming SECDED EDAC 50 coupled to the output of the write FIFO 42; a Single Nibble Correction/Double Nibble Detection (SNCDND) EDAC 52 coupled to the output of the SECDED EDAC, the output of which is fed to the DRAM 30 (FIG. 2). The buffer memory 38 also includes a second SNCDND EDAC 54 coupled to the output of the DRAM 30; and a second SECDED EDAC 56 coupled to the output of the second SNCDND EDAC 54, as shown. The second SNCDND EDAC 56 is fed to the read FIFO 43, as shown.

The SECDED and SNCDND EDACs are described in a paper entitled "Single Byte Error Correcting-Double Byte Error Detecting Codes for Memory Systems" by Shigeo Kaneda and Eiji Fujiwara, published in IEEE Transactions on Computer, Vol. C-31, No. 7, July 1982. pages 569–602, the entire subject matter thereof being incorporated herein by reference.

More particularly, the SECDED EDAC 50 receives data with redundant bits from the controller 22. Here the data is 64 bits and there are 8 redundant bits, i.e., a 72 bit word. The 72 bit word is written into the write FIFO 42 as described in the above-referenced co-pending patent application.

When read from the write FIFO 42, the 72 bit word is passed to the first SECDED EDAC 50 for correction of a single bit error or detection of a double bit error in the 72 bit word read from the write FIFO 42. The SECDED EDAC 50 includes a conventional syndrome 60 fed by the redundant bits, here the 8 redundant bits of the 72 bit word from the write FIFO 42 and the here N=64 bits of data in such 72 bit word is fed to a SECDED generator 62. The output of the syndrome 60 is a m=8 bit word which is fed to a SECDED corrector 64 to thereby generate an N+M=72 bit correction vector. The correction vector produced by the SECDED corrector 64 is fed to an exclusive OR 66 along with the 72 bit word produced at the output of the FIFO 42. The exclusive OR 66 corrects the 72 bit word produced at the output of the FIFO 42 with the correction vector produced by the SECDED corrector 72 in accordance with the double bit Hamming code, assuming at most a single bit error in the 64 bit data.

The output of the SECDED EDAC 50 is fed to the SNCDND EDAC 52 which generates a P=16 bit nibble redundant code along with the 72 bits of data produced by the SECDED 50. The N=64 bit portion of the 72 bit word produced by the SECDED EDAC 50 is encoded by the SNCDND EDAC 52 to enable downstream correction of a single nibble error (i.e., 4 bit error) in the N+P=80 bit word or to enable detection of an error if two nibbles are found to be in error. Thus, the SNCDND generator 52 produces a P=16 bit redundancy code which is stored in an EDC register 70; the 72 bit word produced by the FIFO 50 being stored in a write register 72. Thus, the EDC and write registers 70, 72 together store an N+P=80 bit word for storage in the DRAM 30 (FIGS. 2A and 3). As noted above, the DRAM 30 includes 20 DRAM packages P"$_1$–P"$_{20}$; here, as noted above each package stores 4 bits of the word fed to it. Thus, here, the N=64 bits, B$_1$–B$_{64}$ are stored in packages P"$_1$–P"$_{16}$ and the P=16 redundant bits B$_{65}$–B$_{80}$ are stored in packages P"$_{17}$–P"$_{20}$, as shown in FIG. 2A.

When the 80 bit word is read from the DRAM 30 they are fed to an EDC register 74 and read register 76 (FIG. 4). The 16 redundant bits B$_{65}$–B$_{80}$ of the word are stored in the EDC register 74 and 64 data bits, B$_1$–B$_{64}$ of such word are stored in the read register 76. The 80 bits of word stored in the EDC and read registers 74, 76 are fed to the SNCDND EDAC 54 to detect any errors in each of the 20 sets of nibbles stored in packages P"$_1$–P"$_{20}$ using the four sets of redundant nibbles stored in packages P"$_{17}$–P"$_{20}$. Such single nibble correction/double nibble detection process is described in the above referenced paper. The SNCDND EDAC 54 corrects a nibble if there is only one erroneous nibble (i.e., a defect in one of the packages) or will detect the presence of an error if there are two erroneous nibbles (i.e., defects in two of the packages).

The SNCDND EDAC 54 includes a SNCDND regenerator 80 fed by the 64 bits of the word in the read register 76 and a syndrome 82 fed by the four nibbles of redundant data in the EDC register 74. A SNCDND corrector 84 produces a correction vector which is used by the exclusive OR 88 to correct any single nibble error or to detect any double nibble error in the 64 bits of data read from the DRAM 30. The corrected output produced by the exclusive OR 88 is fed to the SECDED 56 (here a double Hamming code EDAC), to produce an redundant 8 bit code for the 64 bit word produced by the SNCDND EDAC 54. The 72 bit word produced by the EDC and SECDED generator sections of the SECDED EDAC 54 are fed to the read FIFO 43, as indicated. Thus, a controller 22 (FIG. 2) which is fed the 64 bit word read from read FIFO 43 is adapted to have the double bit Hamming EDAC therein correct for any errors which may be produced in passing the 64 bit word from the write FIFO 43 to such controller 22.

Figure 5:
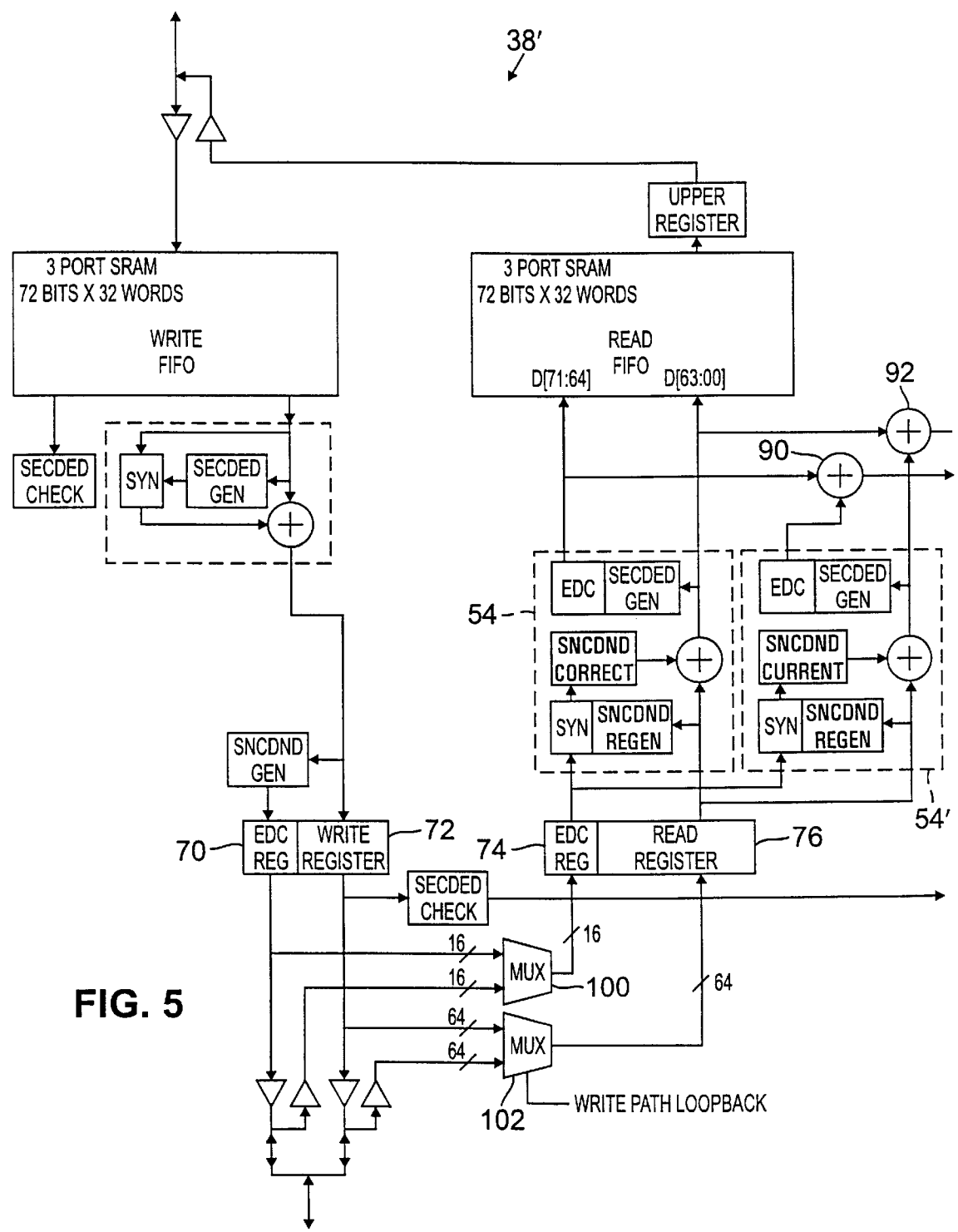
FIG. 5 is a block diagram of an exemplary one of a pair of buffer memories used in the interface of FIG. 3 according to an alternative embodiment of the invention.

Referring to FIG. 5, a buffer memory 38' is shown which includes all of the elements in buffer memory 38 (FIG. 4) and in addition thereto a redundant SNCDND EDAC and SECEDE EDAC in section 54'.

The two SNCDND EDACs and SECEDE EDACs 54, 54' are combined with exclusive OR gates 90, 92, as shown to detect internal faults in the buffer 38' that would otherwise result in data corruption. Further, during writing to the DRAM 30, a write path loop back signal is provided from control logic network 32 to direct the outputs of registers 70 and 72 to the inputs of registers 74 and 76, via multiplexers 100, 102, respectively. During this writing mode the two SNCDND EDACs and SECEDE EDACs 54, 54', should detect no errors, otherwise there is an internal fault.

Figure 6:
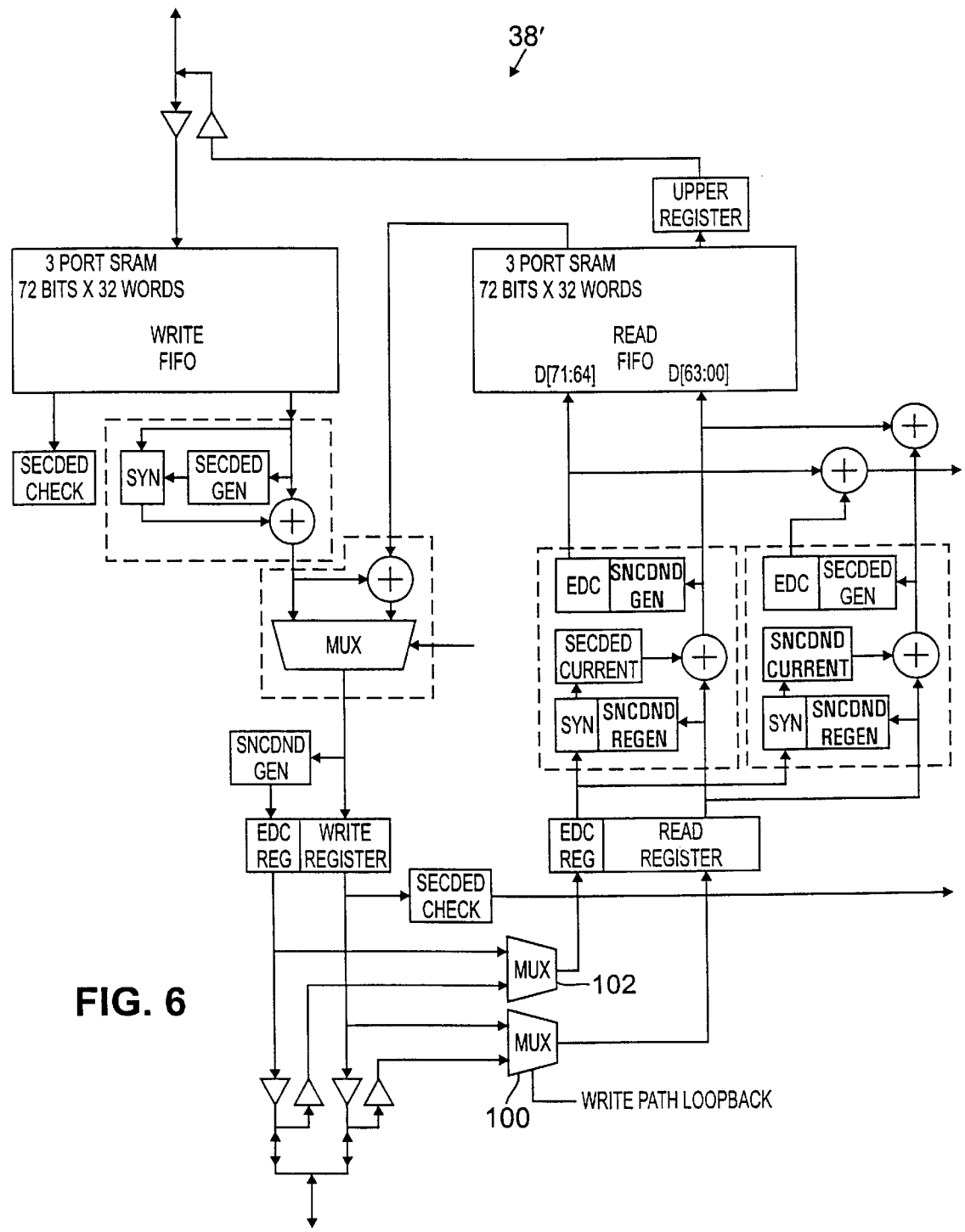
FIG. 6 is a block diagram of an exemplary one of a pair of buffer memories used in the interface of FIG. 3 according to another alternative embodiment of the invention.

Referring now to FIG. 6, the buffer memory 38' (FIG. 5) is modified to include exclusive OR gaging as described in a patent application entitled "Data Storage System Having Data Reconstruction", inventors John Walton and Eli Leshem, filed concurrently herewith and assigned to the same assignee as the present invention, the entire subject matter thereof being incorporated herein by reference.

Other embodiments are within the spirit and scope of the appended claims.

What is claimed is:

1. A memory system, comprising:
   a buffer for storing a digital word having N bits of data and M redundant bits for error detection and correction;
   a error correction code generator for converting the digital word into a second digital word having the N bits of data and P redundant bits for error detection and correction, where P is different from M;
   a memory section adapted to store the second digital word and to have read therefrom such stored second digital word; and
   an error correction code unit for correcting an error in the second digital word read from the memory.

2. A method for operating a memory system, comprising:
   receiving a digital word having N bits of data and M redundant bits for error detection and correction;
   converting the digital word into a second digital word having the N bits of data and P redundant bits for error detection and correction, where P is different from M;
   storing in a memory section the second digital word;
   reading the stored second digital word from the memory section; and
   correcting an error in the second digital word read from the memory in response to the P redundant bits read from the memory section.

3. A method for operating a memory system, comprising:
   receiving a first digital word having N bits of data and M redundant bits for error detection and correction;
   converting the first digital word into a second digital word having the N bits of data and P redundant bits for error detection and correction, where P is different from M;
   storing in a memory section the second digital word;
   correcting an error in the second digital word read from the memory in response to the P redundant bits read from the memory section; and determining, in response to the M bits of the first digital word, whether there is an error in the data portion of the received first digital word.

4. A method for operating a memory system, comprising:

receiving a digital word having N bits of data and M redundant bits for error detection and correction;

converting the digital word into a second digital word having the N bits of data and P redundant bits for error detection and correction, where P is derived from the N bits of the received digital word and where P is different from M;

storing in a memory section the second digital word, such memory section comprising a plurality of memory packages, an error in storing or retrieving N bits of the data of the second digital word in any one of the packages being correctable by the P redundant bits of such stored second digital word reading the stored second digital word from the memory section; and correcting an error in the second digital word read from the memory in response to the P redundant bits read from the memory section.

5. A method for operating a memory system, comprising:

receiving a first digital word having N bits of data and M redundant bits for error detection and correction;

converting the first digital word into a second digital word having the N bits of data and P redundant bits for error detection and correction, where P is different from M;

storing in a memory section the second digital word, such memory section comprising a plurality of memory packages, an error in storing or retrieving N bits of the data of the second digital word in any one of the packages being correctable by the P redundant bits of such stored second digital word;

reading the stored second digital word from the memory section;

correcting an error in the second digital word read from the memory in response to the P redundant bits read from the memory section; and determining, in response to the M bits of the first digital word, whether there is an error in the data portion of the received first digital word.

6. A method for operating a memory system, comprising:

receiving a digital word having N bits of data and M redundant bits for error detection and correction;

converting the digital word into a second digital word having the N bits of data and P redundant bits for error detection and correction, where P is derived from the N bits of the received digital word and where P is different from M;

storing in a memory section the second digital word, such memory section comprising a plurality of memory packages, an error in storing or retrieving N bits of the data of the second digital word in any one of the packages being correctable by the P redundant bits of such stored second digital word and an error in storing or retrieving N bits of the data of the second digital word in two of the packages being detectable by the P redundant bits of such stored second digital word;

reading the stored second digital word from the memory section; and correcting an error in the second digital word read from the memory in response to the P redundant bits read from the memory section.

7. A method for operating a memory system, comprising:

receiving a first digital word having N bits of data and M redundant bits for error detection and correction;

converting the first digital word into a second digital word having the N bits of data and P redundant bits for error detection and correction, where P is derived from the N bits of the received digital word;

storing in a memory section the second digital word, such memory section comprising a plurality of memory packages, an error in storing or retrieving N bits of the data of the second digital word in any one of the packages being correctable by the P redundant bits of such stored second digital word and an error in storing or retrieving N bits of the data of the second digital word in two of the packages being detectable by the P redundant bits of such stored second digital word;;

reading the stored second digital word from the memory section;

correcting an error in the second digital word read from the memory in response to the P redundant bits read from the memory section; and determining, in response to the M bits of the first digital word, whether there is an error in the data portion of the received first digital word.

8. A memory system, comprising:

an error correction code generator for receiving a digital word having N bits of data and M redundant bits for error detection and correction and for converting the digital word into a second digital word having the N bits of data and P redundant bits for error detection and correction, where P is different from M;

a memory section for storing the second digital word;

an error detection and correction unit for receiving the stored second digital word read from the memory section, and for detecting and correcting an error in the second digital word read from the memory in response to the P redundant bits read from the memory section.

9. A memory system, comprising:

a error correction code generator for receiving a first digital word having N bits of data and M redundant bits for error detection and correction and for converting the first digital word into a second digital word having the N bits of data and P redundant bits for error detection and correction, where P is different from M;

a memory section for storing the second digital word from the memory section;

an error detection and correction unit for detecting and correcting an error in the second digital word read from the memory in response to the P redundant bits read from the memory section and for determining, in response to the M bits of the first digital word, whether there is an error in the data portion of the received first digital word.

10. A memory system, comprising:

an error correction code generator for receiving a digital word having N bits of data and M redundant bits for error detection and correction and for converting the digital word into a second digital word having the N bits of data and P redundant bits for error detection and correction, where P is derived from the N bits of the received digital word and where P is different from M;

a memory section for storing the second digital word, such memory section comprising a plurality of memory packages, an error in storing or retrieving N bits of the data of the second digital word in any one of the packages being correctable by the P redundant bits of such stored second digital word;

a error detection and correction unit for detecting and correcting an error in the second digital word read from the memory in response to the P redundant bits read from the memory section.

11. A memory system, comprising:

an error correction code generator for receiving a first digital word having N bits of data and M redundant bits for error detection and correction and for converting the first digital word into a second digital word having the N bits of data and P redundant bits for error detection and correction, where P is different from M;

a memory section for storing the second digital word, such memory section comprising a plurality of memory packages, an error in storing or retrieving N bits of the data of the second digital word in any one of the packages being correctable by the P redundant bits of such stored second digital word;

a error detection and correction unit for reading the stored second digital word from the memory section, for detecting and correcting an error in the second digital word read from the memory in response to the P redundant bits read from the memory section, and for determining, in response to the M bits of the first digital word, whether there is an error in the data portion of the received first digital word.

12. A memory system, comprising:

an error correction code generator for receiving a digital word having N bits of data and M redundant bits for error detection and correction and for converting the digital word into a second digital word having the N bits of data and P redundant bits for error detection and correction, where P is derived from the N bits of the received digital word and where P is different from M;

a memory section for storing the second digital word, such memory section comprising a plurality of memory packages, an error in storing or retrieving N bits of the data of the second digital word in any one of the packages being correctable by the P redundant bits of such stored second digital word and an error in storing or retrieving N bits of the data of the second digital word in two of the packages being detectable by the P redundant bits of such stored second digital word;

an error detection and correction unit for reading the stored second digital word from the memory section and for detecting and correcting an error in the second digital word read from the memory in response to the P redundant bits read from the memory section.

13. A memory system, comprising:

an error correction code generator for receiving a first digital word having N bits of data and M redundant bits for error detection and correction and for converting the first digital word into a second digital word having the N bits of data and P redundant bits for error detection and correction, where P is derived from the N bits of the received digital word;

a memory section for storing such second digital word, such memory section comprising a plurality of memory packages, an error in storing or retrieving N bits of the data of the second digital word in any one of the packages being correctable by the P redundant bits of such stored second digital word and an error in storing or retrieving N bits of the data of the second digital word in two of the packages being detectable by the P redundant bits of such stored second digital word;;

an error detection and correction unit for detecting and correcting an error in the second digital word read from the memory in response to the P redundant bits read from the memory section and for determining, in response to the M bits of the first digital word, whether there is an error in the data portion of the received first digital word.

* * * * *